May 17, 1949.  D. A. LUTON ET AL  2,470,507
ELECTRIC FISHING REEL
Filed Jan. 13, 1947  2 Sheets-Sheet 1
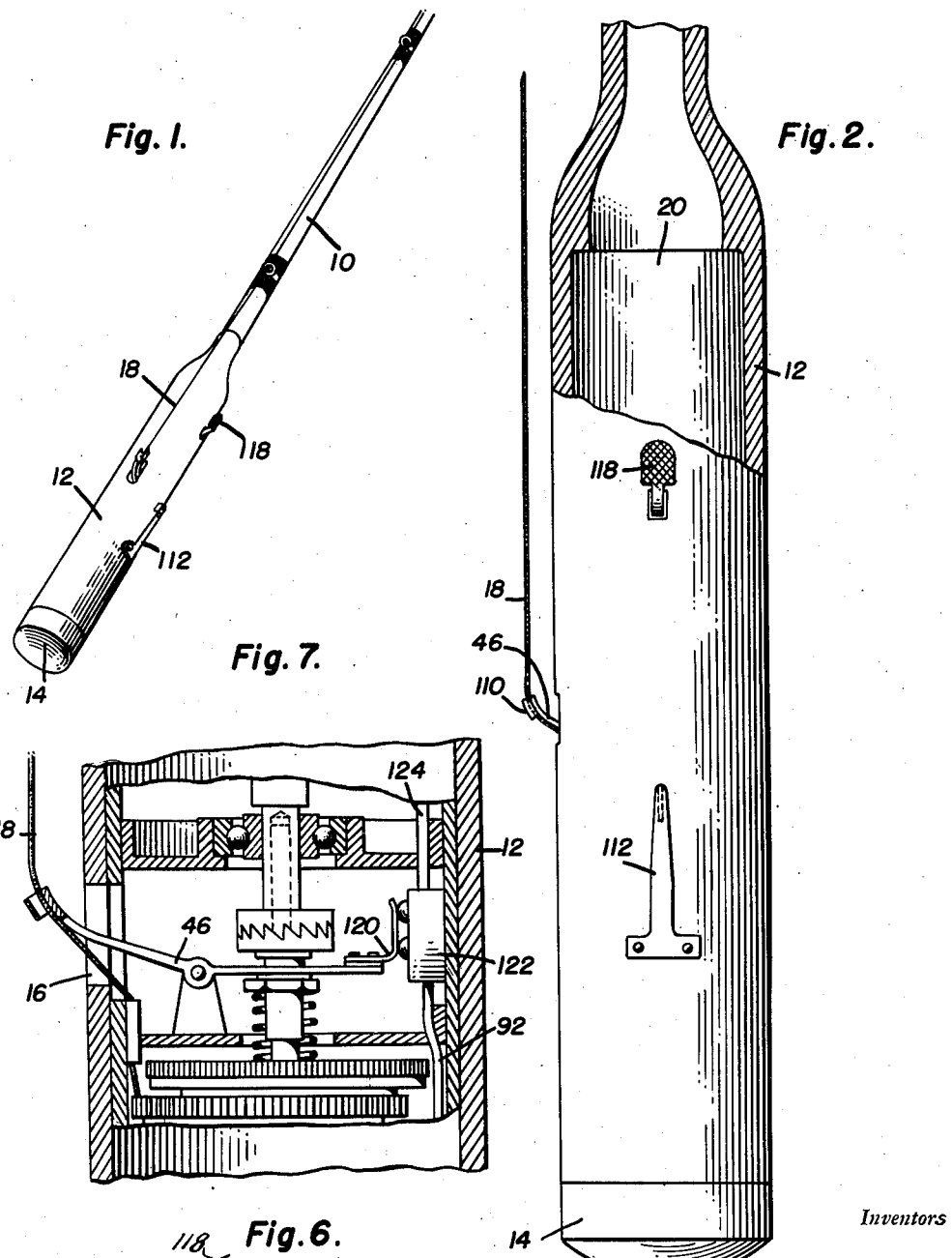
Inventors
Dempsey A. Luton
Karl M. Johnson
By
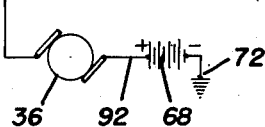
Attorneys May 17, 1949.  D. A. LUTON ET AL  2,470,507
ELECTRIC FISHING REEL
Filed Jan. 13, 1947    2 Sheets-Sheet 2
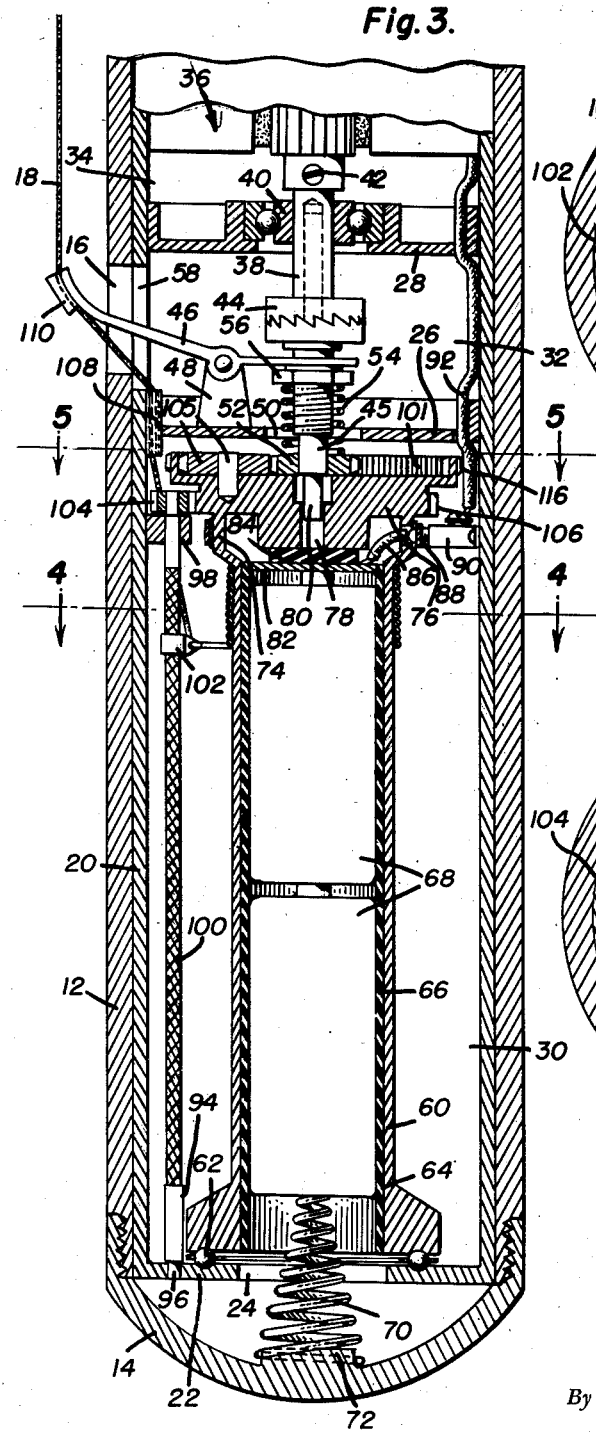
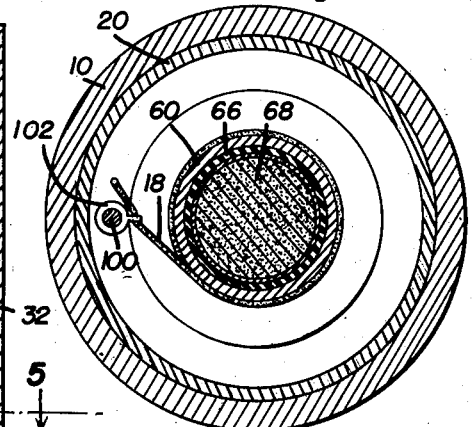
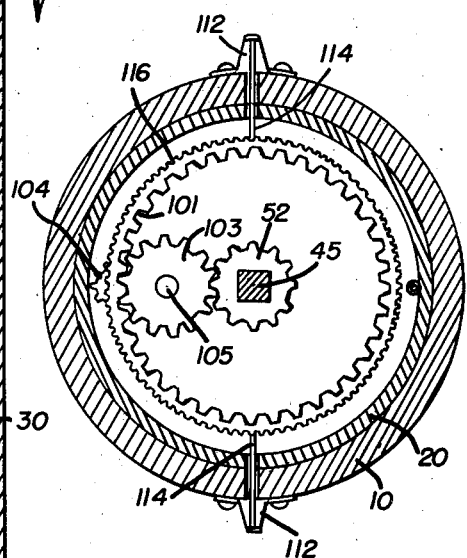
Inventors
Dempsey A. Luton
Karl M. Johnson Patented May 17, 1949

2,470,507

UNITED STATES PATENT OFFICE 2,470,507

ELECTRIC FISHING REEL

Dempsey A. Luton and Karl M. Johnson,
Jackson, Wyo.

Application January 13, 1947, Serial No. 721,784

6 Claims. (Cl. 242—84.4)

This invention comprises novel and useful improvements in an electric fishing reel and more specifically pertains to a self-contained unitary assembly including a power driven reel adapted for insertion into fishing rod handles.

The principal objects of our invention are to provide a unitary power driven reel assembly which is compactly designed for installation into a hollow fishing rod handle; wherein an electric motor is employed for operating the fishing reel; wherein provision is made for powering said motor from self-contained dry cells stored in a novel manner in the assembly; wherein a self-winding mechanism is incorporated into the unitary assembly; wherein a novel overload pressure release mechanism is provided for disconnecting the driving mechanism from the fishing reel as desired.

Other ancillary objects of our invention are to provide a device of the character set forth above which shall be of light weight, compact, sturdy, durable and efficient in design, and which may be inexpensively constructed.

These, together with various other objects of the invention which will later become apparent as the following description proceeds, are realized by our device, one embodiment of which has been illustrated by way of example only in the accompanying drawings, wherein:

Figure 1 is a perspective view of a portion of a fishing rod into which our device has been incorporated;

Figure 2 is a top plan view, parts being shown in section, of a fishing rod handle to which our device has been applied;

Figure 3 is a vertical central longitudinal sectional view through a portion of a fishing rod handle into which our device has been incorporated;

Figure 4 is a transverse vertical sectional view being taken substantially upon the line 4—4 of Figure 3;

Figure 5 is a vertical sectional view being substantially upon the line 5—5 of Figure 3; and Figure 6 is a diagrammatic view of the electric circuit of our device.

Figure 7 is a detail view in central vertical section, showing a modified form of the pressure responsive clutch release means.

Attention is now directed more specifically to the attached drawings, wherein like numerals indicate similar parts throughout the several views and wherein 10 indicates a portion of a fishing rod having a hollow cylindrical handle 12 provided with an end cover cap 14 screw threadedly engaged thereon. As shown best in Figures 3 and 7, the handle is provided with a longitudinally extending slot 16 adapted to permit passage of a fishing line 18 into the interior thereof in a manner to be subsequently set forth.

Attention is now directed more specifically to Figure 3 wherein the construction of our unitary assembly is illustrated. A cylindrical sleeve 20 of a suitable diameter to snugly but removably fit within the bore of the hollow handle 12, is closed at one end with a closure 22 axially apertured at 24 for a purpose to be subsequently apparent. A pair of partitions axially and longitudinally spaced and designated at 26 and 28 are secured in any suitable manner within the cylindrical sleeve 20 intermediate the ends thereof, and serve to divide the interior of the cylindrical member 20 into three axially aligned chambers 30, 32 and 34 constituting a reel chamber, an intermediate chamber and a motor chamber respectively. An electric motor, indicated generally at 36 is mounted in any convenient manner in the motor chamber 34 and serves to rotate a drive shaft 38 which extends through suitable antifriction bearing means 40 in the partition 28 and is detachably connected as at 42 with the armature of the motor. A clutch coupling member 44 of any known type, is mounted upon the drive shaft 38 and detachably couples the same in driving relation to the driven shaft 45 which is axially aligned therewith. The clutch 44 is controlled by an operating lever 46 which is suitably journaled upon a supporting bracket 48 mounted upon the partition 26. The driven shaft 45 extends through an aperture 50 in the partition 26 and has a driving gear 52 non-rotatably but slidably splined thereon for a purpose to be later set forth. A coil spring 54 surrounds the driven shaft 45 and is retained between the driving gear 52 and an adjusting nut 56 screw threadedly engaging a portion of the driven shaft 45 for adjusting the tension of the coil spring 54. It will thus be seen, that the spring 54 urges the nut 56, the driven shaft 45, in a direction to engage the clutch element 44 and establish and maintain a co-operative engagement between the driving and driven shafts 38 and 45.

The wall of the casing 20 is longitudinally slotted at 58, in a manner to register with the slot 16 in the handle 12, in order to permit the end of the operating lever 46 to extend through both said slots for a purpose to be later set forth. A fishing reel 60 is rotatably and axially mounted in the compartment 30, and has its outer end portion journaled as by ball bearings 62 upon the inner surface of the closure plate 22 for the purpose of supporting and centering the outer end of the reel. The reel 60 is provided with an axial bore 64 therethrough, which bore is of the same diameter as the aperture 24 and which is lined with an insulating or non-conducting sleeve 66 within which are removably seated two or more conventional dry cell batteries 68 which are urged inwardly of the reel and of the sleeve by means of a coil spring 70 which is seated upon and located by a metallic bolt 72 formed upon the metallic closure cap 14. At its inward end, the hollow reel 60 is diametrically enlarged as at 74 to provide an annular shoulder and is then again diametrically enlarged by an integral closure plate 76 across the end thereof. The closed end portion 76 is axially bored as at 78 to receive and journal in both a rotatable and slidable manner, the reduced end portion 80 of the driven shaft 45. The bearing engagement at 78 and 80 thus serves both to support the driven shaft 45 and also to journal and support the inner end of the reel 60. A metallic conducting disc 82 is secured in the inner end of the insulating sleeve 66 and constitutes a terminal for engagement by the central electrode terminals of the dry cell batteries 68, said disc 82 engaging an insulating washer 84 interposed between said disc and the inwardly extending axial bulge of the closure member 76. A conductor 86 connects the metallic disc 82 with the conducting ring 88 mounted upon the shoulder 74. As shown, the conductor 86 will extend through a suitable aperture in the walls of the shoulder 74. A conventional type of conducting brush 90 is mounted for rotating contact with the ring 88 and is connected by a conductor 92 with the electric circuit of the motor 36, in a manner well known but not shown.

A level winding mechanism for evenly positioning the fishing line 18 upon the reel 60 is provided within the reel chamber 30, said mechanism consisting of a rotatable shaft 94 arranged within suitable bearings 96 and 98 in the casing 20, and reversely-threaded as at 100 to cause continuous reciprocation of a level winder 102 of a known type. At its inner end, the shaft 94 is provided with a driven gear 104 which meshes with a ring gear 106 formed upon the enlarged portion 76 of the reel. A guide sleeve which may preferably be in the form of a tube 108 is secured to the inner surface of the casing 20 and extends through an aperture in the partition 26, to guide the fishing line 18 through the slots 16 and 58, through the partition 26 and through a suitable aperture in the level winder 102 from which it is fed upon the reel or dispensed from the reel 60. A curved guide 110 is secured upon the outer end of the operating arm 46 of the clutch lever and the fishing line 18 extends therethrough for a purpose to be now described.

As will be understood from the foregoing, the spring 54 urges the clutch 44 into an engaged position in accordance with the tension of the spring as regulated by the adjusting nut 56, to thereby maintain a driving connection between the motor 36 and the reel 60. Whenever the tension in the fishing line 18 exceeds a predetermined value, corresponding to that for which the tension of the spring 54 has been adjusted, and which predetermined tension will normally be selected by such factors as the strength of the line 18, the strength of the motor 36, and similar factors, the angular disposition of the line 18 as it is entrained over the operating lever 46 by means of the guide tube 110 causes a clockwise pull upon the operating lever 46 in opposition to the action of the spring 54. When sufficient tension is exerted upon the line 18, the lever 46 overcomes the resistance of spring 54 and causes a disengagement of the elements of the clutch 44, thereby breaking the driving engagement between the motor 36 and the reel 60.

In order to provide the customary brake drag upon the reel, as when playing a fish, a pair of arms 112 preferably of resilient material are secured upon diametrically opposite sides of the rod handle 12, and are provided with detent members 114 extending through suitable aligned apertures in the rod handle and the casing 20, and into engagement with the teeth of the ring gear 116 formed upon member 76, to thereby exert a braking action upon the same. As will be understood, the fisher may selectively increase or release this braking pressure by controlling the pressure exerted upon the flexible members 112. As shown best in Figure 2, a finger operated switch 118 is mounted upon the outer surface of the handle 12 and is electrically connected into the line 92 which extends from the brush 90 to the electric motor 36, for thereby controlling the operation of the motor and the winding of the reel as required. As shown in the diagrammatic sketch of Figure 6, the dry cells are grounded as by the coil spring 70 to the frame of the casing 20 and rod handle 12, and are connected by the conductor 92 to the electric motor 36, which motor is then controlled by the manual switch 118 connected to the ground.

Attention is now directed to Figure 7 showing a modified form of the clutch control and release means. In this embodiment of the invention, the clutch operating lever 46 has at the lower end thereof a resilient, angularly extending spring contact arm 120 which is so positioned that in response to abnormal movement of the lever 46 in response to an over-load upon the line 18, the switch member 120 is urged to closing position upon the contacts of a switch member 122 connecting the power line for the motor 92, with a grounding line 124, to thereby prevent actuation of said motor.

It is to be understood that if desired the batteries may be eliminated and the electric motor powered by a flexible electric cable, not shown in any suitable manner.

We claim as our invention:

1. A unitary, power driven reel assembly, for fishing rods, comprising: a casing, an axially apertured closure at one end of said casing, a first and second partition axially spaced and intermediately disposed in said casing and forming a reel chamber, a motor chamber and an intermediate chamber, an axially extending reel rotatably mounted in said reel chamber, an electric motor axially positioned in said motor chamber, a drive shaft and clutch connected with said motor and mounted in said intermediate chamber and gearing means in said reel chamber connecting said drive shaft and said reel, said reel having an axial bore, dry cell batteries in said axial bore and circuit means operably connecting said batteries and said motor.

2. A unitary, power driven reel assembly, for fishing rods, comprising: a casing, an axially apertured closure at one end of said casing, a first and second partition axially spaced and intermediately disposed in said casing and forming a reel chamber, a motor chamber and an intermediate chamber, an axially extending reel rotatably mounted in said reel chamber, an electric motor axially positioned in said motor chamber, a drive shaft and clutch connected with said motor and mounted in said intermediate chamber and gearing means in said reel chamber connecting said drive shaft and said reel, said reel having an axial bore for receiving dry cell batteries and circuit means operably connecting said batteries and said motor, a nonconductive sleeve in said axial bore of said reel, said dry cell batteries being removably positioned in said sleeve.

3. A unitary, power driven reel assembly, for fishing rods, comprising: a casing, an axially apertured closure at one end of said casing, a first and second partition axially spaced and intermediately disposed in said casing and forming a reel chamber, a motor chamber and an intermediate chamber, an axially extending reel rotatably mounted in said reel chamber, an electric motor axially positioned in said motor chamber, a drive shaft and clutch connected with said motor and mounted in said intermediate chamber and gearing means in said reel chamber connecting said drive shaft and said reel, said reel having an axial bore for receiving dry cell batteries and circuit means operably connecting said batteries and said motor, said reel having an end portion of enlarged diameter, an annular conducting ring on said portion of enlarged diameter, an electric conductor having a relatively rotatable connection with said ring and connected with said motor, said ring being electrically connected with said batteries.

4. A unitary, power driven reel assembly, for fishing rods, comprising: a casing, an axially apertured closure at one end of said casing, a first and second partition axially spaced and intermediately disposed in said casing and forming a reel chamber, a motor chamber and an intermediate chamber, an axially extending reel rotatably mounted in said reel chamber, an electric motor axially positioned in said motor chamber, a drive shaft and clutch connected with said motor and mounted in said intermediate chamber and gearing means in said reel chamber connecting said drive shaft and said reel, said reel having a closed end portion of enlarged diameter, an axial bore in said reel for slidably and rotatably receiving an end of said drive shaft.

5. A unitary, power driven reel assembly, for fishing rods, comprising: a casing, an axially apertured closure at one end of said casing, a first and second partition axially spaced and intermediately disposed in said casing and forming a reel chamber, a motor chamber and an intermediate chamber, an axially extending reel rotatably mounted in said reel chamber, an electric motor axially positioned in said motor chamber, a drive shaft and clutch connected with said motor and mounted in said intermediate chamber and gearing means in said reel chamber connecting said drive shaft and said reel, said reel having a closed end portion of enlarged diameter, an axial bore in said reel for slidably and rotatably receiving an end of said drive shaft, an internal gear on said end portion engageable with said gearing means.

6. A unitary, power driven reel assembly, for fishing rods, comprising: a casing, an axially apertured closure at one end of said casing, a first and second partition axially spaced and intermediately disposed in said casing and forming a reel chamber, a motor chamber and an intermediate chamber, an axially extending reel rotatably mounted in said reel chamber, an electric motor axially positioned in said motor chamber, a drive shaft and clutch connected with said motor and mounted in said intermediate chamber and gearing means in said reel chamber connecting said drive shaft and said reel, said reel having a closed end portion of enlarged diameter, an axial bore in said reel for slidably and rotatably receiving an end of said drive shaft, an internal gear on said end portion engageable with said gearing means and a ring gear on said enlarged portion, a level winder journaled in said reel compartment and geared to said ring gear.

DEMPSEY A. LUTON.
KARL M. JOHNSON.

REFERENCES CITED

The following references are of record in the file of this patent:

UNITED STATES PATENTS

| Number | Name | Date |
|---|---|---|
| 769,142 | Atkinson | Sept. 6, 1904 |
| 902,447 | Piper | Oct. 27, 1908 |
| 1,005,015 | French | Oct. 3, 1911 |
| 1,062,488 | McCluer et al. | May 20, 1913 |
| 2,399,863 | Forestiere, Sr. | May 7, 1946 |